US006229621B1

(12) United States Patent
Kulakowski et al.

(10) Patent No.: US 6,229,621 B1
(45) Date of Patent: May 8, 2001

(54) WIRELESS SYSTEM FOR BROADCASTING, RECEIVING AND SELECTIVELY PRINTING PACKETS OF INFORMATION USING BIT-STRING SELECTION MEANS

(75) Inventors: Robert T. Kulakowski, Leucadia, CA (US); Robert Marshall, El Paso, TX (US); George Rogers, Long Beach, CA (US)

(73) Assignee: NoWorld Marketing, Ltd., El Cajon, CA (US)

( * ) Notice: Subject to any disclaimer, the term of this patent is extended or adjusted under 35 U.S.C. 154(b) by 0 days.

(21) Appl. No.: 09/096,444

(22) Filed: Jun. 11, 1998

(51) Int. Cl.[7] .................................................. G06F 15/00

(52) U.S. Cl. ........................ 358/1.15; 358/142; 348/473; 359/136

(58) Field of Search .................................... 348/473, 359, 348/136, 172; 359/137, 158, 142, 200; 370/342, 413, 352; 400/88; 358/142

(56) References Cited

U.S. PATENT DOCUMENTS 5,070,404 * 12/1991 Bullock et al. ...................... 358/142
5,859,414 * 1/1999 Grimes et al. ...................... 235/383
5,917,629 * 6/1999 Hortensius .......................... 359/136
5,949,492 * 9/1999 Mankovitz .......................... 348/473

* cited by examiner

*Primary Examiner*—Jeffrey Gaffin
*Assistant Examiner*—Thanh Y. Tran
(74) *Attorney, Agent, or Firm*—Grimes & Battersby, LLP

(57) ABSTRACT

A system is provided for dispatching one or more packets of information selected from the group consisting of redeemable coupons, messages, appointment reminders, confirmations, tickets, warnings and written packets to potential recipients at a remote location. The system utilizes a remote receiver and printer having a unique identification number and bit-string code based on predetermined characteristics of the subscriber. The steps included in the system include: (1) developing a subscriber directory containing unique identification information for each of the potential recipients; (2) creating a packet to be dispatched to at least one of the recipients; (3) identifying the potential recipients for a particular packet by identification number or bit-string code; (4) transmitting the packet through a pager network to all of the potential recipients; and (5) receiving and selectively processing and printing only those packets intended to be processed and printed by the appliance.

24 Claims, 11 Drawing Sheets

SUBSCRIBER DIRECTORY

| PMA NO. | LAST NAME | FIRST NAME | ADDRESS | CITY | STATE | ZIP | REGION | FAMILY | RESIDENCE | INCOME | SPORTS INTEREST | AUTO | COMPUTER |
|---|---|---|---|---|---|---|---|---|---|---|---|---|---|
| 17432 | Jones | Tom | 1234 First St. | El Paso | TX | 79932 | Southwest | 2A, 2C | Single Family | $112,000 | Football | Ford | Compaq |
| 20731 | Smith | Dave | 9999 Melrose Place | Chicago | IL | 60616 | Midwest | S | Apartment | $41,000 | Football | Chevy | Sony |

*FIG. 2*

PROFILE BIT-STRING GROUPINGS

| Bit-String Number | Type | Profile Characteristics |
|---|---|---|
| 000–100 | Geography, Zip Codes | 00 National<br>01–99 Zip Codes |
| 101–130 | Household Composition | Number, Males, Females<br>Children, Pets, etc. |
| 131–160 | Home Type | Apartment, Townhouse<br>Condo, Single Family |
| 161–170 | Household Income | Ranges in $1K<br><15; 15–30; 31–50;<br>51–75; 75–100; etc. |
| 171–200 | Lifestyle Interests | Hobbies, Interests,<br>Activities, Affiliations, etc. |
| 201–1000 | Brand Usage | Grocer, Department<br>Stores, Automobiles,<br>Computers, Audio Equipment,<br>Packaged Goods, etc. |

*FIG. 3*

MESSAGE BANK TABLE

| DATE | PRIORITY | MESSAGE TYPE | TEXT | GRAPHICS | DESTINATION CRITERIA | PARTS |
|---|---|---|---|---|---|---|
| | | | | | | |

*FIG. 4*

DAILY MESSAGE BATCH.....DUE DATE 6/1/98

| MESSAGE SEQUENCE | PRIORITY CODE | SENDER | MESSAGE TYPE | TEXT | GRAPHICS | DESTINATION CRITERIA | PARTS |
|---|---|---|---|---|---|---|---|
| 1520001 | 1 | Kellog | Coupon | Corn Flakes.....$1.00 | Logo, Package Picture | National | 1 |
| 1520002 | 1 | IRS | Reminder | Estimated Tax Due by September 15, 1998 | Smiley Face, Clip art | Incomes>$75,000 | 1 |
| 1520003 | 2 | Ford | Rebate | $500 Rebate for Escort Owners, Due by 10/19/98 | Logo, Silhouette | Ford Owners | 1 |
| 152004 | 3 | Columbia | Reminder | Medical Visit Appointment | Logo, Clip Art | Patient PMA Nos. | 1 |
| 152005 | 4 | Delta | Confirmation | Prior Day Detail of Reservations | Logo, Clip Art | PMA's of Subscribers | 1 |
| | 5 | Molly Maid | Reminder | Sceduled Cleaning Visits | Logo, Clip Art | PMA's of Subscribers | 1 |

*FIG. 5*

TYPICAL MESSAGE BIT-STRING DESTINATION CODES

| MESSAGE TYPE: | | COUPON | ADVERTISEMENT | WARNING |
|---|---|---|---|---|
| Criteria | | Zips 76–80<br>Single Family<br>>$50K Income | Zips 00–99<br>All Known<br>Pic 'N Save Shoppers | Zips 60–70<br>Snow Alert |
| Bit String (Category) | | | | |
| 000<br>100 | Geography | 76–80 | 0–100 | 60–70 |
| 101<br>130 | Composition | 101–130 | 101–130 | 101–130 |
| 131<br>160 | Residence | 135 | 131–160 | 131–160 |
| 161<br>170 | Income | 161–170 | 161–170 | 161–170 |
| 171<br>200 | Interests | 171–200 | 171–200 | 171–200 |
| 201<br>1000 | Brand Usage | 201–1000 | 443 | 201–1000 |

*FIG. 6*

INDIVIDUAL MESSAGE CODE STRING

| MSN No. | Priority Code | Pictorial Format Graphics & Text | Destination Code String | Destination PMA Code | Bit String Code |
|---|---|---|---|---|---|
| | | | | | |

*FIG. 7*

EXAMPLE OF DATA CONTENT IN SAMPLE COUPON MESSAGE

| MSN No. | Priority Code | Pictorial Format Graphics & Text | Destination Code String | Destination PMA Code | Bit String Code |
|---|---|---|---|---|---|
| 1520001 | 1 | Mfg. Logo, product silhouette, value, expire date, terms and conditions of offer, bar code offer number | 0 | 999999999 | |
| 1520002 | 2 | Estimated Tax Due 9/15/98; Smiley Face Clip Art | 1 | | 000 000 ...169... |
| 1520005 | 3 | Confirmation of Reservations; Logo and Clip Art | 2 | 000123456 + Private Key PIN No. | |
| 1520006 | 4 | Reminder to Get Teeth Cleaned | 0 | 000001076 000022085 | |

*FIG. 8*

MESSAGE IDENTIFICATION NUMBER

| ????? | Message Sequence Number | Year |
|---|---|---|
| | 152001 | 98 |
| | 152002 | 98 |
| | 152003 | 98 |

SAMPLE PMA ELIGIBILITY BIT-STRING CODE NUMBERS

| | PROFILE | ACTIVE BITS | PROFILE | ACTIVE BITS |
|---|---|---|---|---|
| PMA UNIT NO. | 17432 | | 20731 | |
| LOCATION 0-100 | El Paso<br>Zip 79932 | 79 | Chicago<br>Zip 60616 | 60 |
| COMPOSITION 101-130 | 2 Adults<br>2 Children | 128 | 1 Male | 102 |
| RESIDENCE 131-160 | Single Family | 135 | Apartment | 132 |
| INCOME 161-170 | $112,000 | 168 | $41,000 | 162 |
| INTERESTS 171-200 | Gardening<br>Football<br>Computers | 174<br>181<br>190 | Horses<br>Football<br>NASCAR | 172<br>181<br>187 |
| BRAND USAGE 201-1000 | Ford<br>Compaq<br>Billards<br>Panasonic<br>Kellogg<br>Nabisco | 206<br>312<br>427<br>539<br>611<br>788 | Chevrolet<br>Macintosh<br>Pic 'N Save<br>Sony<br>Post<br>General Foods | 208<br>336<br>443<br>588<br>618<br>721 |

*FIG. 13*

RECEPTION ACCEPTANCE MATCHING

MESSAGE DESTINATION STRING

| | | | | | | |
|---|---|---|---|---|---|---|
| Coupon | 76–80 | 101–130 | 135 | 161–170 | 171–200 | 201–1000 |
| Advert. | 0–100 | 101–130 | 131–160 | 161–170 | 171–200 | 240 |
| Warning | 60–69 | 101–130 | 131–160 | 161–170 | 171–200 | 201–1000 |

PMA ACCEPTANCE STRINGS

| | | | | | | |
|---|---|---|---|---|---|---|
| PMA 17432 | 79 | 128 | 135 | 168 | 174,181<br>190 | 206,212<br>227,239<br>240,251<br>253 |
| PMA 20731 | 60 | 102 | 132 | 162 | 172,181<br>187 | 208,236<br>243,249 |

RECEPTION ACCEPTANCE TEST

PMA 17432

| | | | | | | |
|---|---|---|---|---|---|---|
| Coupon | Yes | Yes | Yes | Yes | Yes | Yes |
| Advert. | Yes | Yes | Yes | Yes | Yes | No |
| Warning | No | Ineligible | | | | |

PMA 20731

| | | | | | | |
|---|---|---|---|---|---|---|
| Coupon | No | Ineligible | | | | |
| Advert. | Yes | Yes | Yes | Yes | Yes | No |
| Warning | Yes | Yes | Yes | Yes | Yes | Yes |

PMA20731 accepts and prints the Warning only

*FIG. 14*

WIRELESS SYSTEM FOR BROADCASTING, RECEIVING AND SELECTIVELY PRINTING PACKETS OF INFORMATION USING BIT-STRING SELECTION MEANS

FIELD OF THE INVENTION

The present invention relates generally to a wireless system for broadcasting, receiving and selectively printing packets of information such as redeemable coupons, messages or virtually any packet of information or graphics and, more particularly, to such a system which comprises method and apparatus for selectively broadcasting such messages through conventional pager network to a network of printer appliances that are adapted to convert such messages to a readable permanent format such as, for example, a printed copy in which bit-string means are is used to permit the printer appliances to selectively process only those messages intended to printed, i.e., only those messages which have bit-strings that match the bit-strings of the printer appliance. In its broadest form the subject system in essence creates a universal delivery system for virtually any type of information packet that is currently delivered using conventional means such as the United States Postal Service or overnight delivery service such as Federal Express, etc. One particularly unique application for such system is the broadcasting and generation of redeemable consumer coupons in printed format that can be redeemed by consumers at retail outlets although it should be appreciated that the system of the present invention has applicability in generating virtually any type of printed message.

DESCRIPTION OF THE PRIOR ART

The dispatch of packets of printed information to individual households including, for example, the transmittal of consumer coupons is well known. Individuals are accustomed to receiving such printed messages from a variety of different sources including, for example, the mail, overnight delivery services, house to house door-hanger crews, private runner services, the print media and the like. Conventional methods for dispatching and delivering such printed messages to a large number of individual households are limited severely by the need for manually handling and delivering the printed copy. While these vehicles are capable of handling large volumes of messages on a daily basis, the need to manually deliver such messages imposes certain constraints on the system in terms of both cost and delivery time.

Telecommunications systems for conveying and delivering messages have improved rapidly over the past decade. For example, facsimile systems have become a common method for the distribution of printed messages and other communications. The speed and cost of such facsimile systems are quite favorable when compared with the conventional methods described above. Facsimile transmissions are, however, severely limited in terms of reach and, generally speaking are inappropriate for mass, broadcast messaging. The appeal and utility of such transmissions is also somewhat limited by the requirement and expense of telephone line connections.

More recently, the Internet has become a very potent force in delivering printed messages. As with all other forms of delivery systems, however, there are constraints in terms of reach capability, line connection, and the need for a computer and operating software and auxiliary and ancillary systems. Moreover message recipients must have a certain degree of computer literacy and, most importantly, the user must assume an active role if the printed messages are to be received.

With respect to redeemable coupons, the most common form of distribution of such products is through the print media, i.e., either as a free standing insert or as part of a print advertisement in a newspaper or magazine. In addition, many coupons are distributed by direct mail. Although this distribution method is slow and very costly, it can be targeted at specific recipient groups through the use of selected mailing lists. This contact approach is used extensively by mail-order marketers, telephone companies, magazine publishers, and insurance or financial service providers.

For the aforementioned reasons, none of these forms of message delivery offer particularly fast and inexpensive distribution of such messages.

SUMMARY OF THE INVENTION

Against the foregoing background, it is a primary object of the present invention to provide a system for delivering printed packets of information to designated recipients employing a bit-string method identifying only those packets to be processed and printed.

It is another object of the present invention to provide such a system that is capable of delivering such packets at a low cost when compared to manual delivery systems.

It is yet another object of the present invention to provide such a system wherein the delivery time of such packets can be controlled and, further, where the packet sequencing and dispatching capability is flexible.

It is still another object of the present invention to provide such a system which has a broad and rapid audience reach and which is able to deliver packets of information virtually simultaneously to pre-determined but widely diverse recipient groups.

It is still yet another object of the present invention to provide such a system where the recipient is able to automatically receive a printed copy of the packet of information using a printer appliance.

It is but another object of the present invention to provide such a system that includes means to prevent the packet of information being delivered from improper or unauthorized copying as well as providing a remote disarming capability for individual printer appliances.

It is but still another object of the present invention to provide such a system in which the packet can be traced to a particular printer appliance.

It is but yet another object of the present invention to provide such a system that includes a series of printer appliances that require minimal maintenance and attention.

It is another object of the present invention to provide method and apparatus to effect the objects and advantages of such system.

To the accomplishments of the foregoing objects and advantages, the present invention, in brief summary, comprises a new system for originating, transmitting, receiving and printing packets of information directly to consumers through a network of unique printer appliances. Such information may constitute messages, redeemable coupons, advertisements, warnings, appointment reminders, tickets and the like. Since the techniques are essentially electronic in nature, the system eliminates the need to physically handle or deliver such packets that vastly improves its efficiency in terms of delivery cost and time. The severe reach limitations of the facsimile and Internet systems are eliminated since the system of the present invention can operate in a broadcast mode which is optimal for mass message delivery. With the inclusion of innovative communication filters, the system can limit delivery to a single printer appliance, all printer appliances or a select group of printer appliances.

The system of the present invention does not require the installation of new telephone line connections, requires virtually no technology literacy or any active participation on the part of the recipient in actually receiving and obtaining printed copies of the information packets being transmitted. Using a novel printer appliance, packets can be delivered to the home, office, store, or automobile or virtually anywhere where electrical power is accessible.

The present system is characterized by an ability to inexpensively reach a precise target in the marketplace with minimal recipient involvement. The essential transmission methodology is through established national pager networks such as, for example, those operated by Pagenet or Skytel, which are capable of reaching more than 90% of U.S. households. The majority of the remaining audience can be reached by building relays to operators of local pager networks. In addition, the system may work in conjunction with conventional cellular telephone technology such as, for example, Sprint, MCI, etc. as well as with dedicated satellite transmission systems, or from an RF transmitter from a cable tap, satellite dish tap, remote control or other source. Future versions may employ any current or future wireless boardcase, multicast, or narrocast technology for transmission.

Since the audience is accessed in a virtual parallel mode by a broadcasting system, the number of required transmission channels is minimal. In addition, access/delivery costs are very low, i.e., in the hundredths of a cent for a typical packet, depending upon the size of the audience.

Although the system employs a broadcast transmission method, the incorporation of blocking filters enables the system to deliver either a specific packet to an individual appliance or to all or substantially all of the printer appliances as well as virtually everything in between.

One component of the system is a high-performance, upgradable subscriber database such as, for example, those relational type databases provided by Oracle or Informix, containing detailed bibliographic, demographic and other unique subscriber information. Such information can be obtained, for example, from appliance purchase registrations, supplier purchases, warranty activities, subscriber surveys and response information as well as from other sources. This data may be further supplemented with information such as demographic, economic, lifestyle, family formation, interests etc. from a wide gamut of outside sources such as mailing-list vendors, catalog marketers and magazine publishers. The versatility of this database combined with the selectivity of the blocking filters permits extremely precise message targeting based on definable recipient profiles.

A strong advantage of the proposed system is the incorporation of the maintenance-free printer appliances used by proposed recipients of such messages. With such devices, the recipient does not have to assume an active role in the messaging process. There is no need for even minimal technology or computer literacy since the initial setup and subsequent operation are simple and straightforward. So long as the appliance has power and paper, print messages will be automatically received. It is envisioned that most of the messages will be delivered during the night to take advantage of very low traffic on the pager network at such times. Thus, the incorporation of a printer appliance requiring minimal maintenance and attention is extremely important.

It is contemplated that the system of the present invention will have particular applicability in the promotion and advertising fields, particularly in the distribution and delivery by packaged-goods manufacturers of redeemable coupons. The majority of coupons are presently distributed as newspaper inserts or as part of a print advertisement in a newspaper or magazine. However, the device is capable of transmitting, receiving and printing almost any packet of information or graphics.

Another potential application for the information delivery system of the present invention is for providing alerts to individuals such as, for example, warnings of threatening weather, anticipated driving conditions, road construction activities, lawn watering regulations, wood burning restrictions, airport closings, and the like.

The delivery system may also be used to provide reminders to individuals of appointments such as, for example, medical and dental appointments, car servicing prompts, pick-ups from the cleaners, special event reminders, impending visits from the plumber, electrician, pest control technician, maid-service and the like.

Invoices and statements can also be delivered using the delivery system of the present invention. For example, bills of all types including utilities, telemarketing sales, event tickets, travel tickets, tickets to attractions, loan repayments, insurance, mortgage etc., may be directly delivered with huge savings in time, labor, postage and envelopes and creative preparation.

In addition, the system can be used for disseminating and printing e-mail messages.

Yet another application for the information delivery system of the present invention is to provide confirmations for airplane tickets, hotel reservations, car rentals etc. which had, heretofore, been distributed by mail or other conventional delivery system. Similar savings in overall delivery expense are attainable using the present system.

Other messages that can be distributed include, for example, jokes of the day, recipes, horoscopes, lottery tickets, gambling receipts, and other personal messages.

BRIEF DESCRIPTION OF THE DRAWINGS

The foregoing and still other objects and advantages of the present invention will be more apparent from the detailed explanation of the preferred embodiments of the invention in connection with the accompanying drawings, wherein:

FIG. 2 is a sample table for the subscriber directory used in conjunction with the information delivery system of the present invention.

FIG. 3 illustrates the possible profile bit-string groupings that may be used in conjunction with the information delivery system of the present invention.

FIG. 4 is a sample table in which the messages that are stored in the message bank of the present invention.

FIG. 5 is an example of a daily message batch created using the message bank of the information delivery system of the present invention.

FIG. 6 is a sample of typical message bit-string destination codes that may be used in conjunction with the information delivery system of the present invention.

FIG. 7 is a sample table of the message code string used in conjunction with the information delivery system of the present invention.

FIG. 8 illustrates the type of data that may be contained in a sample coupon message used in conjunction with the information delivery system of the present invention.

FIG. 13 illustrates the typical eligibility bit-string filter that may be created from the data in the subscriber directory table of FIG. 4.

FIG. 14 is a table illustrating the reception eligibility matching of the printer appliance of the present invention.

DESCRIPTION OF THE PREFERRED EMBODIMENTS

Figure 1:
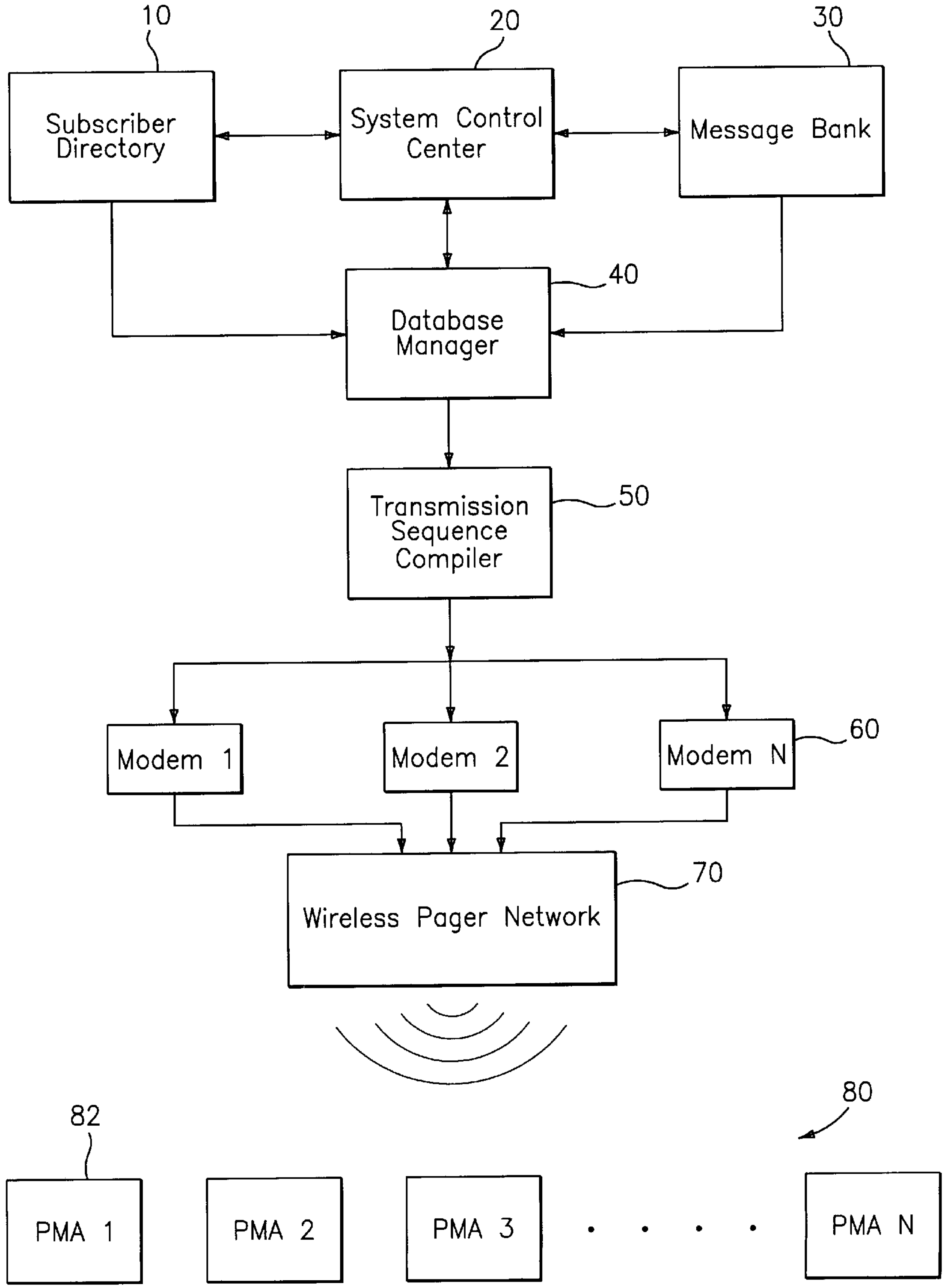
FIG. 1 is a flow diagram illustrating the information delivery system of the present invention.

Referring to the drawings, FIG. 1 is a flow diagram describing the information delivery system of the present invention which includes eight major components: (1) a subscriber directory 10; (2) a system control center 20; (3) a message bank 30; (4) a database manager 40; (5) a transmission sequence compiler 50; (6) a bank of modems 60; (7) a transmitter network 70; (8) and a network of printer appliances 80. It should be appreciated that the subscriber directory 10, the system control center 20, the message bank 30, the database manager 40 and the transmission sequence 50 compiler are software modules that may be maintained on one or a plurality of separate but interconnected or networked computer systems. Such computer systems can be microcomputers to mainframes. Certain software functions of certain modules may be incorporated into any of the appliances.

The subscriber directory 10 is a database and maintains records of all system subscribers, i.e., those individual or entities who will receive the messages through the printer appliances 80. The subscriber directory 10 is preferably maintained in a conventional database program such as, for example, Oracle, dBase, Paradox. While flat file database programs may be used, relational databases such as the ones described above are preferred.

The subscriber directory 10 maintains the serial numbers of all the printer appliances 80 that have been released to the market place. The appliance serial number for such appliances is very significant because it serves as a message destination code or address for directing messages using the system. Through the database manager 40, the serial number can be linked to detailed household information including geographical address and subscriber profile data. The appliance serial number is always printed on all delivered messages. If a message also serves as a discount coupon or other voucher, the identification of the issuing source can be identified upon redemption. This would, for example, enable a promotion sponsor to track the event and obtain information on the respondents for inclusion in his customer database. A printer appliance owner would have the option to deny use of any of his or her personal information for any use for privacy reasons.

Other data that can be maintained by the subscriber directory 10 includes bibliographic, geographic, demographic, household information, brand preferences, hobbies, spending habits, ailments, and other individual characterizations.

A sample table illustrating the subscriber directory is shown in FIG. 2 and, includes, for example, information relating to the subscriber's name, address, geographical region, family composition, residence type, income, interests and brand usage. It should, of course, be appreciated that virtually any type of information concerning the subscriber may be maintained depending upon the particular application. Thus, for example, if the subscriber directory is to be used in conjunction with the delivery of appointment reminders, information concerning the subscriber's patient number, appointment history and insurance information may be maintained.

The information contained in the subscriber directory 10 can be outputted in print form similar to a regular telephone directory and used by senders in compiling their message lists. A hard-copy directory might be used, for example, in a medical practitioner's office in preparation of a message list to remind patients of their appointments for the coming week. Large-scale users such as utility companies may be allowed secured direct access to the directory or provided with magnetic tape, diskette or ROM forms for assigning serial number addresses to their invoices.

The subscriber directory 10 potentially has a high commercial value because of the consumer information content and, if desired, may be rented to or shared with manufacturers, direct mail or telephone marketers, per published privacy policies and in accordance with governing laws and proper notification to users.

The data contained in the subscriber directory 10 is, in a preferred embodiment, maintained in bit-string format which facilitates the ability to sort such data and subsequently match the data to corresponding requirements in the printer appliances 82 upon broadcast.

A sample of possible bit-string groupings is included in FIG. 3 in which multiple digit numbers are assigned to a particular field and data. For example, bits between 000 and 100 may be assigned to the geography and zip code of the subscriber; bits 101–130 may be assigned to household composition data; bits between 131–160 to the type of home; 161–170 to the family income; 171–200; and above 200 to brand usage, etc. It is anticipated that up to 1000 bits may be used in this regard although this number may be increased or decreased if necessary.

The system control center 20 may be run on most current CPUs including microcomputers and main frame computers and provides overall management and administration for the entire information delivery system. It is composed of a computer and associated input/output peripherals incorporating software modules that perform functions such as:

a. Collecting and accepting new system information such as the serial numbers of additional printer appliances, new messages, and new and updated subscriber profile data.

b. Relaying and entering new information to the appropriate repositories, e.g., new serial numbers to the subscriber directory 10, messages to the message bank 30 and profile information to the database manager 40.

c. Editing, updating and generally maintaining the subscriber directory 10, message bank 30, and database manager 40.

d. Providing support to the database manager 40 and transmission sequence compiler 50 in posting and dispatching messages, and tracking sender volumetrics for billing.

Basic utilities to support the above functions generally exist within the management system of modern database products.

The message bank 30 is a table in a database of the type such as, for example, Oracle, dBase, Paradox, etc. The message bank 30 serves as a vast repository for collecting and storing messages pending distribution. It would preferably have a highly versatile data reception capability to permit messages to be received electronically, recovered from storage media such as disk, ROM, swipe cards or tape, optically scanned from hard copy by barcode or optical character readers or, as a last resort, entered by keyboard.

Upon entry into the message bank 30, the messages are stored in table format of the type illustrated in FIG. 4. The message bank 30 contains the date that the message is to be delivered, the priority of delivery (e.g., urgent), the type of message, (e.g., coupon, warning, advertisement, etc.), the text and graphic of the message, the destination criteria (e.g., national, specific subscribers, selected groups of subscribers, etc.) and whether the message needs to be broken into parts due to its length.

The message bank will, on a daily basis, process those messages that are to be delivered during such day. FIG. 5 illustrates the manner in which a sample batch of message may be processed for a particular day. The messages are initially sorted by the date on which they are to be delivered and then by priority. Thus, all urgent messages (e.g., priority 1) would be delivered before increasingly less urgent messages (e.g., priorities 2–0). Messages of a particular priority, e.g., 1 would be delivered in the order that they were initially received by the system.

Bits conforming to the bit-string sequence of the subscriber table identify the destination criterion identified in the message bank table. For example, FIG. 6 illustrates the application of the bit-string procedure discussed previously concerning the subscriber bank 10 with reference to a group of messages. Note, in particular, that by using the bit-string procedure heretofore discussed, it is possible to quickly and specifically target a group or groups of individuals. For example, the coupon may be directed to a specific geographical area, a specific type of household and a specific income level by simply identifying the applicable bit-string for the targeted groups.

The database manager 40 is a sophisticated system, preferably of the Oracle or Informix genre, due to its need to handle multiple databases including the subscriber directory 10, the message bank 30, and schedule the transmission of messages.

The transmission sequence compiler 50 is a dedicated component with the responsibility for readying message batches so that they can be relayed to the pager network 70 in a controlled and efficient manner. Required tasks for the transmission sequence compiler 50 include sorting and sub-dividing the daily batch into sub-batches for optimal loading to the different modems and prioritizing within these sub-batches to ensure that the messages within the sub-batches are sequenced in accordance with urgency of delivery requirements. An important priority would be, for example, to ensure that early time-zone messages are queued early in the relay process.

FIG. 7 is a sample of the format in which a group of messages ready for transmission would be organized and FIG. 8 provides some examples of data that may be contained in such a table. Note that the messages are sorted by priority and then by message sequence number (MSN). The Destination Code String indicates whether the printer appliances are to receive data based on the individual PMA number or, alternatively, on the bit string code. For example, if the message is intended to be processed only by a particular PMA, the identification number of the targeted PMA or PMA's will be indicated. In such manner, the destination Code String would be "0". Note that one or a multiplicity of PMA identification numbers can be provided.

Where, however, the message is intended to be processed by "groups" of subscribers based on criteria identified in the bit-string codes, the Destination Code String would read "1" or "2" depending upon whether the message was "public" or "private." If public, that is, if it is intended to be an unsecured message, the Destination Code String would be "1" and the Bit Code String would be provided. Thus, if the message was intended to be processed by a particular group of subscribers, the bit-string of such group would be identified in the Bit String Code.

The system of the present invention has the ability to deliver private, secure messages to be printed on printer appliances containing a "private" key. In this manner, the Destination Code String would read "2" and both the PMA number and a Private Key Number unique to that printer appliance would be transmitted as part of the Destination PMA Code.

The transmission sequence compiler 50 assigns a unique Message Identification Number ("MIN") to each message for subsequent audit tracking. The MIN number represents that number of the batch in which the message was transmitted, e.g., 00001, followed by the Message Sequence Number and the year. Thus, the MIN for Message Sequence Number 152001 which was transmitted in the first batch in the year 1998 would be "0000115200198". The assignment of such a MIN permits the system to automatically track the transmission of each message delivered to the system. It further serves to facilitate tracking of production efficiency, volumetrics, and quality control measures.

The bank of modems 60 is the primary channel for telecommunication messages to the pager network 70. Conventional off-the-shelf modems such as, for example those provided by U.S. Robotics, Hayes or other conventional modems may be used. The capabilities of everyday modems are improving rapidly with standard transmission rates currently at least 56 KB. The bank of modems may be replaced by a dedicated cable TV link as the system grows.

Batches of messages from the sequence compiler 50 are telecommunicated by the message bank to the wireless pager network 70 by regular modem—modem interconnection. Such communications are buffered at the network head-end and broadcast as traffic permits. They may be maintained by the network in buffer storage and then transmitted in batches along with other messages or interlaced between other messages. This permits more efficient and convenient transmission and at lower costs than transmission at peak rates.

In certain applications, it may be necessary to install a dedicated traffic monitor, with message storage and retrieval modules, between the bank of modems 60 and wireless pager network 70. This utility is intended to efficiently integrate the high volume of lengthy print messages into the regular, pager transmission activity.

Major providers of pager networks are PageNet, SkyTel, ComCast and others. In addition to the foregoing, there are a host of regional pager networks including, for example, Page 2000 by the Southern New England Telephone Company.

It should, of course, be appreciated that the pager network system may constitute virtually any form of wireless broadcast or narrowcast system now known or developed in the future.

In a typical pager network, the messages are transmitted by the modem bank 60 to the wireless pager network 70 where they are amplified and transmitted to a teleport for uplink to the receiving satellite receiver. The messages are then re-broadcast to a plurality of receiver/retransmitter towers which, again, amplify the signals and re-transmit the messages to the network of printer appliances 80.

The network of printer appliances 80 consists of a plurality of individual printer appliances 82, each having a unique serial number for identification purposes. These appliances include normal pager components and circuitry, combined with a thermal printer and enclosed in a case with a lid allowing easy access for paper placement.

Figures 9, 10:
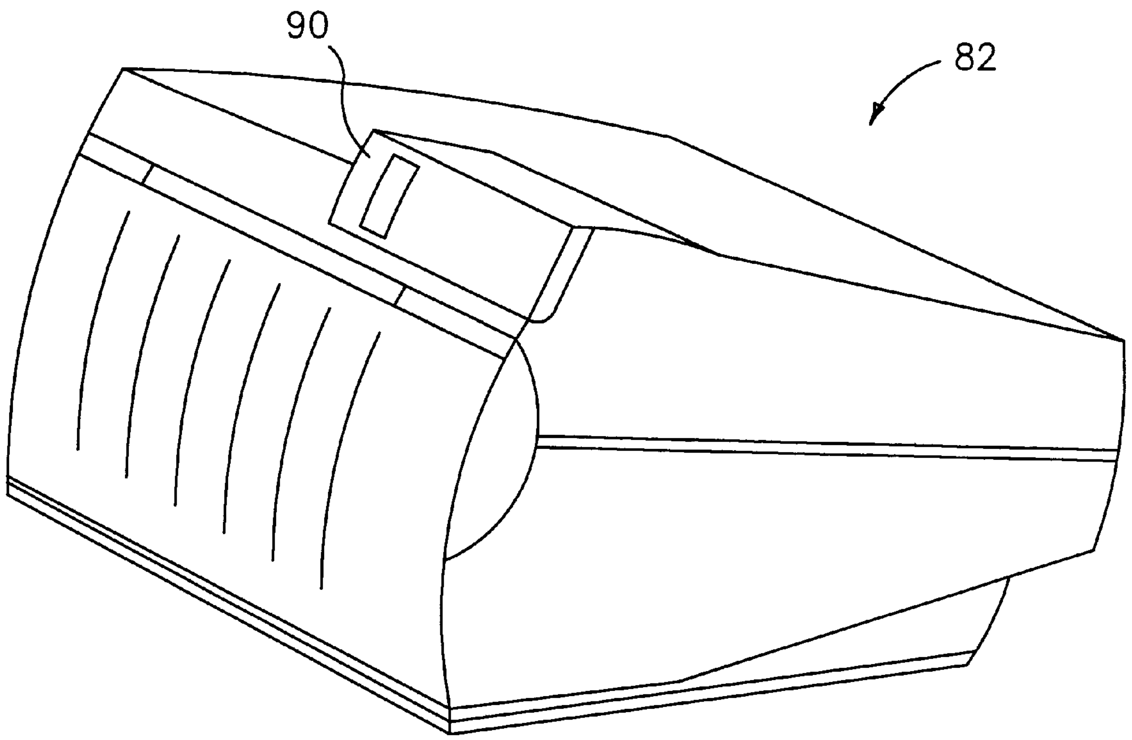
FIG. 9 illustrates the manner in which the message identification numbers of the information delivery system of the present invention are created.
FIG. 10 is a perspective view of the printer appliance used in the information delivery system of the present invention.
Figure 11:
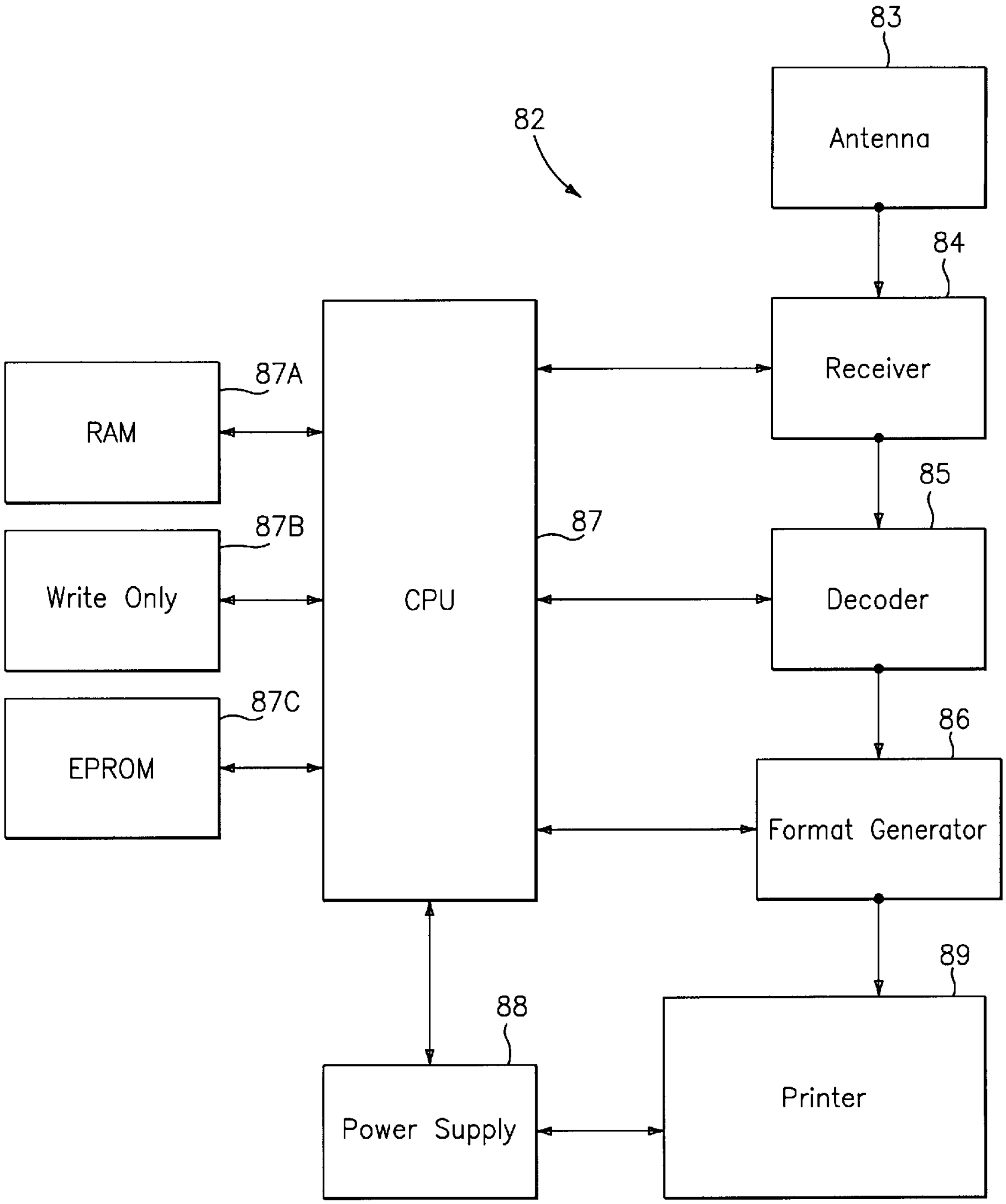
FIG. 11 is a flow diagram illustrating the manner in which the printer appliance of the information delivery system of the present invention operates.

A possible rendition of a printer appliance 82 is illustrated in FIG. 10 and a flow diagram of the function of the printer appliance 82 is shown in FIG. 11.

The printer appliance 82 includes a ferrite core antenna 83, a receiver 84, a decoder 85, filter or format generator 86, microprocessor 87 including random access memory 87A, write only memory 87B and an EPROM 87C, a power supply 88 and a printer 89, preferably of the thermal type although, in future years as the prices come down, it may be possible to use ink-jet or other computer type printers.

It is preferred that the thermal paper be stored in a fan-folded manner rather than a spool or roll although it should be appreciated that a spool or roll may be utilized in some applications. The use of fan-fold paper enhances the design efficiency of the unit. Fan-fold paper provides higher residual paper storage density than roll paper. In addition, by perforating the paper, it facilitates separation of the message paper slips. It also folds and lays flat on delivery with minimal curing that is a serious problem with spooled thermal paper. Since the messages to be delivered using the information delivery system of the present invention are fixed format messages, such formats lend themselves to the use of fan-fold paper.

In a preferred embodiment, the receiver 84 of the printer appliance 82 is a standard pager receiver POCSAG Format, 2400 Baud and the decoder 85 is an off-the shelf POCSAG unit. Other formats than can be used include FLEX and GOLAY. The use of the FLEX format would provide a significant advantage in terms of providing back channel capability for message reception confirmation and is also much more power efficient than the POCSAG format.

A destination code eligibility-matching filter 86 and a basic microprocessor 87, preferably an 8301 or 8051 chip, are also included in the preferred embodiment. 1 Kbytes of RAM 87A is typically sufficient along with at least 128 bytes of EPROM 87B. The incorporation of write-only memory 87B is important to permit storage of the subscriber bit string eligibility filter, allowing subsequent matching with the messages being transmitted. In addition, a conventional consumer appliance type power supply 88 is preferred.

It should be appreciated that printers draw considerable wattage so that there is need for a dedicated power supply 88. Such a power supply 88 would preferably be a stand-alone module due to design and operation restrictions as well as economics. The main unit would be fitted with an LED power-on indicator 90 as shown in FIG. 10 so that a user may quickly see that the appliance is in an active mode.

The printer appliance 82 utilizes established POGSAG technology that is sufficient for most applications. Future versions of the appliance may incorporate a Motorola Flex receiver/decoders if improvements in performance criteria or economics become more attractive or are required. Most of the other components such as the 8051 processor, RAM and EPROM are mass produced devices available at low cost.

The components of the printer appliance 82 represent the initial preferred embodiment of such device. The printer appliance 82 has inherent processing capabilities beyond simply providing the basic tasks. With additional components and control software, extended functionality can be readily incorporated.

The printer appliance 82 may also include, for example, an RS232 port (not shown) to permit transfer of messages to or from an auxiliary system such as a personal organizer, a laptop or desktop computer. Reminder type messages are an obvious candidate for organizer entry. Relay to a personal computer permits messages to be archived, reformatted and the likes as well as offering a host of other print options. It should be appreciated that the printer appliance may also be upgraded to render it compatible with a cable television delivery system of messages such as the one, for example, described in U.S. Pat. No. 5,500,681 which issued on Mar. 19, 1996 to Charles P. Jones for Apparatus and Method for Generating Coupons in Response to Televised Offers, the disclosure of which is hereby incorporated herein by reference thereto.

Similarly, the incorporation of an input port would permit the printer appliance to function as a utility printer to print, for example, e-mail messages thereby rendering the printer appliance 82 a centralized message source.

The incorporation of an IR port (not shown) may also be of particular interest because it may be addressed by an intelligent remote control. See, for example, U.S. Pat. No. 5,500,681 that describes a method for transmitting promotional messages via cable television. Alternatively an intelligent remote control may also capture and store the coupon image and, at the user's convenience, be linked via an IR port to the printer appliance to print the coupon message. Communication between the intelligent remote and the printer appliance may also be accomplished through a RF link.

Incorporation of a display 90 for the printer appliance 82, preferably a LCD, may also serve to facilitate the user interface. It may, for example, flash urgent messages, allow the user to scroll and review messages and provide prompts for error conditions. With additional memory and software upgrades, the recipient may have the choice of visually reviewing the message and selectively printing only those messages that it selected in much the same manner they currently choose which e-mail messages to print.

As a transfer medium, the inclusion of a magnetic stripe or smartcard reader/writer (not shown) into or as an optional attachment to the printer appliance 82 would also allow portability of the stored message, with subsequent printing done at the user's convenience. It is possible that, for example in the case of discount coupon messages, printers would be available at the retail establishment where the purchase is to be made. Apart from the portability aspect, limiting printing to only specifically authorized printers may add another layer of security to the process. In future generations of the system, it is possible that coupon messages would never have to exist in print form. Discount coupons stored on the transfer media may be read at the store checkout station or at an in-store kiosk or display incorporating the appliance and the card reader/writer attachment and the savings applied if the appropriate purchase was made.

In addition, confirmation means (not shown) can be incorporated into the printer appliance 82. In conventional paging network systems using POCSAG technology, there is no back-channel capability. Thus, the broadcaster does not receive any confirmation that the message has actually been delivered. In order to increase the reception probability, it is common to employ a redundancy process where repeat message packets are transmitted at different time intervals, but only printing from any printer appliance a single time.

Each message may be transmitted 2 or 3 times over a course of minutes to insure that they are received. The PMA is able to identify duplicate transmissions and reject the redundant transmission. The receiver has in-built sensing capabilities and ignores repeat receptions. This methodology has worked exceedingly well and will accommodate the vast majority of messages. Reception confirmation may be an issue in those cases where the message has a significant monetary value, as for airline or event tickets.

Skytel has recently introduced a paging service that guarantees message reception and does incorporate back channel, confirmation capability. Their system is based on a new Flex component that does have response capability. Prior to actual message transmission, the particular receiver is polled by the network to determine whether the unit is in an active mode. If a "ready and able" response is echoed, the message is relayed repeatedly until the "AOK" reception confirmation is returned. This modern technology may be utilized when the underlying economics are more favorable for deployment in a high volume consumer appliance.

The entire system is practical and economically viable only if a vast number of printer appliances 82 are installed. Factors that will influence mass acceptance are price, design appeal, available distribution channels, ease of use, minimal user responsibility, and ready message display. While the individual appliances 82 can be of a "basic" nature, as use increases there are many opportunities to add additional functions and features and, possibly, integrate the stand alone appliance into other common household appliances, e.g., radios, televisions, refrigerators, clocks, door chimes, and other popular home electronics.

While the system of the present invention is designed to operate in a continuous message-dispatching mode, it is much more efficient if messages are handled in a batch mode. In this manner, a batch would consist of all messages that were due for delivery on any particular day. These daily batches would be transmitted during the late hours of the prior day and early hours of the due date to take advantage of the low network traffic conditions that exist during sleeping hours.

A unique feature of the system of the present invention resides in the security features of the system, which are intended to prevent fraud and counterfeiting. While some messages contain only information, others such as coupons or tickets have a defined monetary value and are likely candidates for fraud through unauthorized duplication. The present system employs at least five reproduction inhibition techniques: (1) chemically treated paper; (2) color printed edges; (3) reverse side printing; (4) incorporation of a high-resolution pattern; and (5) serial number printing.

In this regard, the printer appliances 82 may employ special, coated thermal paper having a production identification so as to verify the paper source. Similarly, pre-printed color edges may be used on the paper to require color-replicating equipment for duplication. Specific markings may also be printed on the reverse side of the paper that can be automatically sensed using opto-electronic means which can not only assist in alerting the recipient that the appliance is out of paper or there is a paper jam but, also, will serve as a deterrent to unauthorized duplication.

Other deterrents that can be employed to prevent counterfeiting include the incorporation of a high-resolution pattern on the reverse side of the paper. Thus, reproduction may only be accomplished with sophisticated and expensive copy equipment. Finally, the printer appliance 82 would print its serial number on every outputted message which, in addition to providing a unique trace to origin, would serve as a further deterrent to counterfeiting since it is a declaration of identify. In the event that any replication activity was even suspected, a serial number erasure message may be transmitted to immediately disable the particular printer appliance. Alternatively, messages to a specific printer appliance may be eliminated by the system control center 20 or by a flag or field set into the subscriber directory 10 or even in the database manager 40.

With reference to FIG. 1, operation of the information delivery system of the present invention is as follows. The subscriber directory 10 would include the most relevant and current data for a given subscriber. As previously noted, the subscriber directory 10 would include all applicable bibliographic, demographic and user-characteristic information. It may also contain, for example, telephone numbers, health code numbers, social security numbers and other unique numbers that will facilitate the coordination of a PMA serial number to a particular individual or individuals. It is anticipated that the information in the subscriber directory 10 would be updated on a regular basis as new members are added or deleted and as the information relating to a particular member changes. Such data can be inputted either manually or electronically.

It should be noted that for ease of distribution, it is advisable to assign bit-strings to the data contained for a particular subscriber. In this manner, messages can be broadcast for processing only by one or a number of specific appliances or, alternatively, by those appliances that have characteristics that match the criteria in the message. The use of bit-strings substantially reduces the amount of data that needs to be processed by the system when determining the potential recipients of a particular message.

Simultaneously, messages that are to be delivered are inputted into the message bank 30 with specific information concerning the message and delivery instructions, e.g., intended recipients, priority, time and date of delivery, etc.

Upon entry of the appropriate message or messages into the message bank 30 and the subscriber information into the subscription directory 10, the system control center 20 and the database manager 40 then reviews all messages stored in the message bank 30 and segregates them based on the date or dates on which they are to be delivered. Those messages that are to be delivered on a particular date would be identified and segregated. A sample batch of typical messages to be delivered on a particular date is illustrated in FIG. 5.

The database manager 40 then assigns bit-string destination codes for the data contained in the batch of messages using the criteria previously identified in FIG. 6.

The message is then formatted by the inclusion of detailed text and graphics if so instructed. It is contemplated that the database manager 40 will include a vast store of graphic templates such as, for example, prior coupon images, invoice and appointment reminder layouts, logos, simple product pictures, clip-art and a wide variety of text fonts. The database manager 40 would also incorporate a dedicated publisher module with access to the template files and a general capability for semi-automatically designing the printed-message layout. The publisher module would assist in the generation of publisher quality material and would include standards logos, clipart and photographs that would be included in the message. In this manner, the message may simply reference a logo or piece of artwork contained in the publisher module that would then substitute the stored artwork or photographs for incorporation into the message.

In the case of manufacturer discount coupons, the industry guidelines require that the coupon be bar-coded using a standard UPC Coupon Code format which permits a retailer to automatically scan the coupon at the checkout register. Basic code information identifies the issuing manufacturer, classifies product type with a group family code, and denotes the coupon value. An appendix code has recently been endorsed in UPC/EAN format that can carry additional information such as offer number, expiration date and household identification. The publisher may include a subsystem that would automatically generate the numbers for the bar codes and embed them in the coupon message.

Prior to release for relay, the message images might require some manual editing in order to optimize the esthetic presentation of the image.

The compiler 50 then compiles all applicable messages for a particular date, puts then in priority order and then readies them for broadcast.

Where a specific message such as, for example, a message reminder, is to be transmitted to a single appliance, the message would include the specific serial number of the appliance to which the message is to be directed. Similarly, where messages are to be distributed to all appliances, the message would include a default number common to all active appliances, e.g., 99999.

When messages are to be delivered to a profiled group of recipients, the Database Manager 40 would search the database, extract subscribers from the Subscriber Directory 10 matching the specific profile criteria, and then extract the serial numbers of the appropriate appliances from the Subscriber Directory for dissemination to such appliances. It is also possible, especially in the case of promotion or advertising messages that the sender will want delivery to as many recipients as can be reached on his particular roster. This would require that the Database Manager 40 to overlay the customer roster with the Subscriber Directory 10, and extract those serial numbers of the common entries.

Similarly, where the message is to be delivered to a group of subscribers, the bit-string code described above would be part of the message transmitted.

The final process in preparing the daily batch for transmission requires that the transmission sequence compiler 50 in FIG. 1 serializes the message code strings in a priority sequence as determined by delivery urgency. Some messages must be delivered the next day, while others may be carried over to the following day without difficulty. This allows for accommodation if the system becomes capacity stressed or slowed by high network traffic. The daily batch would actually be subdivided before sequence so that the smaller batches may be dispersed amongst many modems and messages and relayed in parallel to the head-end of the pager network 70. Messages will then likely be broadcast by the pager wireless pager network 70 within the normal pager frequency band of 929–932 MHz along with other regular paging message activity.

Messages are then received by all of the printer appliances 82 in the appliance network 80. Functionally the printer appliance 82 operates as follows:

1. The broadcast messages are sensed by the antenna 83 and fed to the receiver 84.
2. The message signal is then pre-amplified and decoded in the CPU.
3. Message acceptance is achieved by the CPU 87 performing a software, password-matching processes. Each particular appliance has at least four levels of passwords, namely: (1) the default appliance serial number (all "9's" to accept and process national messages); (2) the specific appliance serial number (a unique number assigned to each individual appliance); (3) a bit-string eligibility code number (which is derived from the profile of the subscriber); and (4) the private PIN number as defined by the subscriber (for processing of highly secure messages). Each message is codes with one or more of the aforesaid numbers.
4. RAM memory 87A is needed by the CPU 87 for performing multiple tasks including, for example, system management, message handling, destination code matching, bar code generation and the like. EPROM 87C would store security information, and in particular the appliance serial number. Information concerning the characteristics of the subscriber would be stored in the write-only memory 87B to protect against loss during a power failure.

Figure 12:
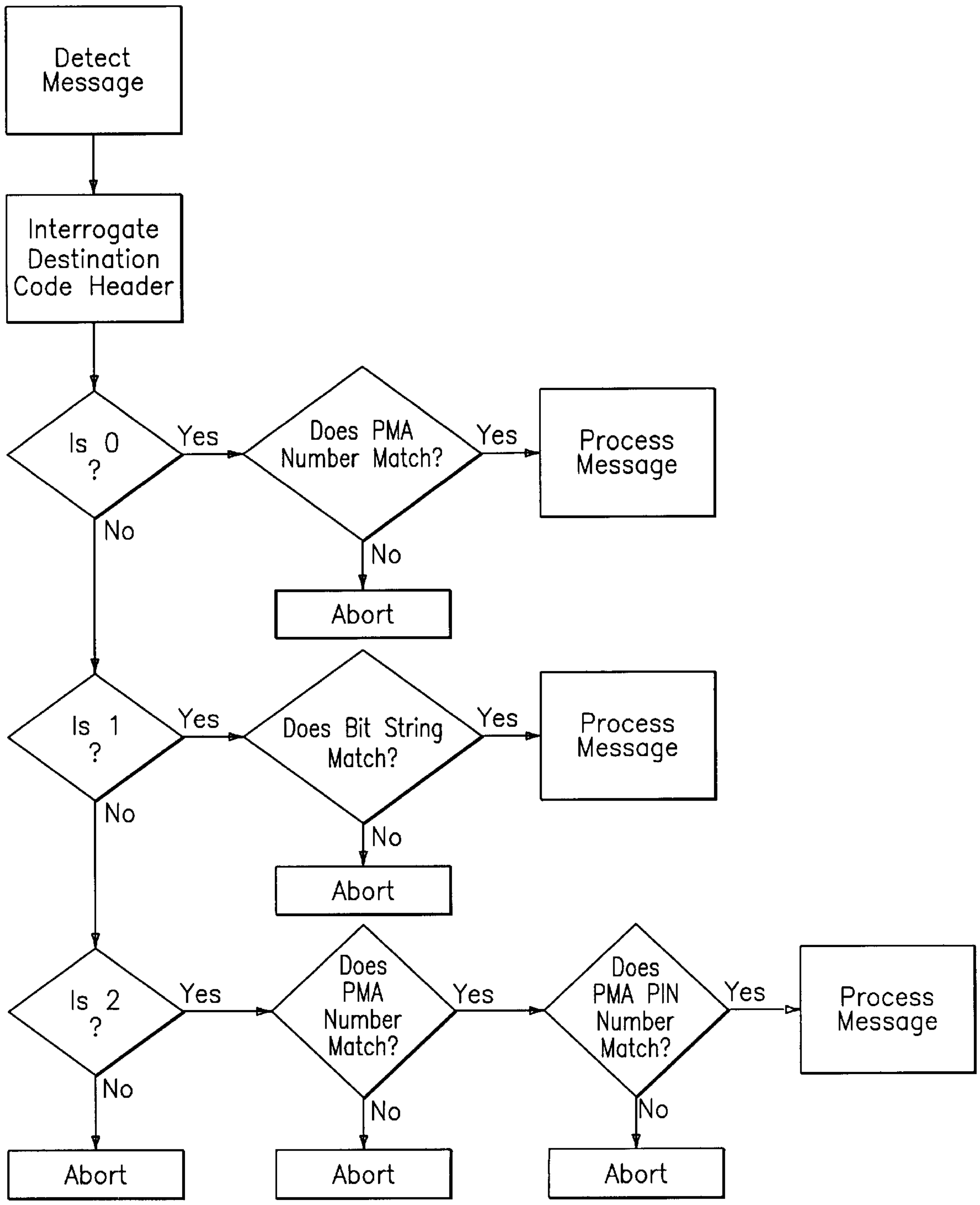
FIG. 12 is a flow diagram illustrating the method for message content processing in the printer appliance of the present invention.

FIG. 12 illustrates the critical, message eligibility process that the CPU in the local printer appliance 82 must perform. To determine whether a message is being addressed to a particular printer appliance 82; the CPU interrogates the destination code header. If the Destination Code String is "0" indicating that the message may only be processed by a specific printer appliance or appliances, it then determines whether there is a match with the PMA number being transmitted with that of the appliance. If there is a match, the message is processed. If not, the process is aborted.

Similarly, if the Destination Code String is "1" indicating that only appliances with a particular bit-string code may process the messages, it then compares the bit-string of the appliance with that of the message. If there is a match to all or a predetermined percentage, the message is then passed on for processing. If there is no match, the process is aborted.

Lastly, if the Destination Code String is "2" indicating that the message is being transmitted to a specific appliance or appliances having a private key, it looks to match the PMA number of the message with that of the appliance. Standard encryption techniques used in RSA and PGP use a public key/private key encryption. An algorithm in the PMA will decrypt the message, process the decrypted message and print it out. It can only be decrypted by the PMA with the private key. If there is a match, it then performs a second function by attempting to match the appliance's private PIN number with the PIN number being transmitted. If both match, the message is processed. If not, the process is aborted.

FIGS. 13 and 14 illustrate a particular sample of bit-string matching between the destination bit-strings contained within the broadcast message and the eligibility bit-string code number contained in the appliance. Note that there needs to be a complete match between the destination bit-string contained in the message and the bit-string of the appliance. In certain situations, it may be feasible to permit the appliance to process a message where only a predetermined percentage of the bit-strings are matched, e.g., at least 25%.

Figure 15:
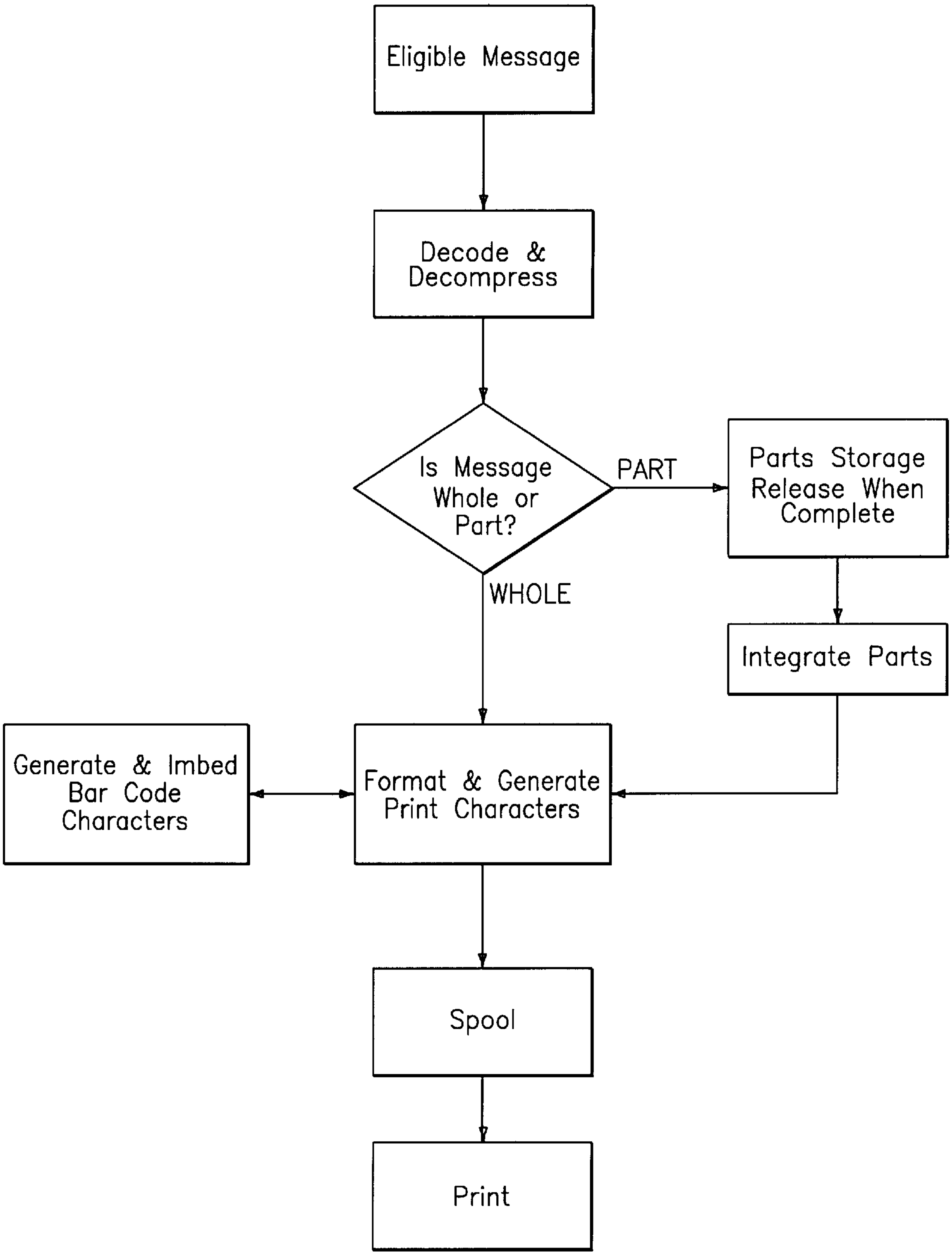
FIG. 15 is a flow diagram illustrating the print processing in the printer appliance of the present invention.

FIG. 15 illustrates the manner in which messages within the appliance may be processed and eventually printed using a message interpretation process. Incoming messages will typically be received in a highly condensed form as the Sequence Compiler has adopted compaction processes such as zipping, zero compression, bit packing and general data compression. The CPU must then decode and decompress the message content.

As previously discussed, in order for a Pager-Network provider to handle the message in a normal manner, the message must be contained within a specified packet length or, alternatively, will be packetized over multiple packets. Some messages, particularly coupons, will include significant graphic content and the total message may have to be transmitted in the form of a packet series. This necessitates inclusion of a pre-content header indicating the number of parts to the message. A byte indicator packet, for example 1 of 3, would serve to alert the system that the message is not complete until all three parts have been received and that the CPU will need to merge the packet contents and reconstruct the total page prior to generating print code.

Having thus described the invention with particular reference to the preferred forms thereof, it will be obvious that various changes and modifications can be made therein without departing from the spirit and scope of the present invention as defined by the appended claims.

What is claimed is:

1. A system for delivering printed packets of information or messages to intended recipients of said packets, said system including:

means for receiving and storing the packets to be delivered;

means for creating a packet bit-string code for each packet based on certain pre-determined criteria;

a wireless pager network for transmitting said packets to said recipients, each of said packets containing a pre-determined bit-string code identifying intended recipient, each of said packets;

a network of printer appliances each having an appliance bit-string code based on certain predetermined criteria, each of said appliances adapted to receive all of said packets, selectively process only those packets having the same bit-string code as the appliance bit-string code, and passively print said selected packets without any further action by a user of said appliance.

2. The system of claim 1, wherein said system further includes a subscriber directory for storing subscriber information from which said bit-strings are created.

3. The system of claim 2, wherein said system further includes a database manager for processing said packets from said means for receiving and storing said packets and the subscriber information from said subscriber directory.

4. The system of claim 3, wherein said system further includes a transmission sequence compiler for placing the packets to be delivered into a predetermined order of transmission to the printer appliances.

5. The system of claim 4, wherein said system further includes at least one modem for conveying said packets from said transmission sequence compiler to said wireless network.

6. The system of claim 1, wherein each of said printer appliances are adapted to provide printed copies of said packets using a thermal printer.

7. The system of claim 1, wherein each of said printer appliances are adapted to transfer said packets to an electronic smart card for subsequent use by the recipient.

8. The system of claim 1, wherein said packets are redeemable coupons.

9. The system of claim 1, wherein said packets are selected from the group consisting of redeemable coupons, messages, appointment reminders, event tickets, warnings, alerts, and advertisements.

10. A system for delivering printed packets of information to intended recipients of said packets, said system including:

a bank for receiving and storing the packets to be delivered;

a subscriber directory for storing the names and information of intended recipients of said packets;

means for creating a packet bit-string code for each packet based on certain predetermined criteria;

a database manager for processing the packets from the bank and subscriber information from said subscriber directory;

a pager network for transmitting said packets to said recipients, each of said packets containing a bit-string code identifying intended recipients of said packets;

a transmission sequence compiler for placing the packets to be delivered into a predetermined order of transmission to the printer appliances; and a network of printer appliances each having an appliance bit-string code based on certain pre-determined criteria, each of said appliances adapted to receive all of said packets, selectively process only those packets having the same bit-string code as the appliance bit-string code, and passively print said selected packets without any further action by a user of said appliance.

11. The system of claim 10, wherein said system further includes a transmission sequence compiler for placing the packets to be delivered into a predetermined order of transmission to the printer appliances.

12. The system of claim 10, wherein said system further includes a modem bank including at least one modem for conveying said packets from said transmission sequence compiler to said pager network.

13. The system of claim 10, wherein each of said printer appliances is adapted to receive all of said packets and process only those packets intended to be processed by said printer appliance.

14. The system of claim 10, wherein said packets are selected from the group consisting of redeemable coupons, messages, appointment reminders, event tickets, warnings, alerts, and advertisements.

15. The system of claim 10, wherein each of said printer appliance has a unique appliance code number.

16. The system of claim 15, further including means for coding said packets with the appliance code numbers of those printer appliances to which said packets are intended for processing and printing.

17. The system of claim 16, wherein said each of said printer appliances includes means for selectively processing only those packets identifying its printer appliance number.

18. A system for delivering printed packets of information to intended recipients of said packets, said system including:

a bank for receiving and storing the packets to be delivered;

a subscriber directory for storing the names and information of intended recipients of said packets;

means for creating a packet bit-string code for each packet based on certain predetermined criteria;

means for coding said packets with appliance code numbers of those printer appliances to which said packets are intended for processing and printing;

a database manager for processing the packets from the bank and subscriber information from said subscriber directory;

a pager network for transmitting said packets to said recipients, each of said packets containing a bit-string code identifying intended recipients of said packets;

a transmission sequence compiler for placing the packets to be delivered into a predetermined order of transmission to the printer appliances; and a network of printer appliances each having a unique appliance code number and an appliance bit-string code based on certain predetermined criteria, each of said appliances adapted to receive all of said packets and selectively process and passively print only those packets having either the same bit-string code as the appliance bit-string code or the unique appliance code number as said printer appliance without any further action by a user of said appliance.

19. A method for transmitting packets of information over a pager network to a network of remote printer appliances, each of said appliances including means to receive and selectively print predetermined packets, said method comprising the steps of:

transmitting one or more of said packets over said pager network to all appliances, each of said packets including a destination identifier to identify only those printer appliances intended to process and print a particular packet;

receiving all of said packets at each of said appliances, said appliance being adapted to decode said destination identifier and selectively process and print only those packets intended to be processed and passively printed by said appliance without any further action by a user of said appliance.

20. The method of claim 19, wherein said packets are redeemable coupons.

21. The method of claim 19, wherein said packets are selected from the group consisting of redeemable coupons, messages, appointment reminders, confirmations, tickets, warnings and written packets.

22. A method for transmitting packets over a pager network to a network of remote printer appliances, said method comprising the steps of:

developing a subscriber directory containing unique identification information for each of said potential recipients;

creating a packet to be dispatched to at least one of said recipients;

identifying the potential recipients for a particular packet using a bit-string code based on predetermined information concerning the potential recipients;

transmitting said packet through a pager network to all of said potential recipients, said packets containing a bit-string code identifying intended recipients of said packets; and receiving, processing and printing only pre-selected packets on a subscriber's printer appliance having a unique bit-string code based on certain pre-determined characteristics of said subscriber by matching the bit-string code of said packet with the bit-string code of said printer appliance without any further action by a user of said appliance.

23. The method of claim 22, wherein said packets are redeemable coupons.

24. The method of claim 22, wherein said packets are selected from the group consisting of redeemable coupons, messages, appointment reminders, confirmations, tickets, warnings and written packets.

* * * * *